United States Patent
Kirvan

(10) Patent No.: US 10,769,968 B2
(45) Date of Patent: Sep. 8, 2020

(54) WIRING INFORMATION DEVICE

(71) Applicant: Matthew Henderson Kirvan, Bethesda, MD (US)

(72) Inventor: Matthew Henderson Kirvan, Bethesda, MD (US)

( * ) Notice: Subject to any disclaimer, the term of this patent is extended or adjusted under 35 U.S.C. 154(b) by 0 days.

(21) Appl. No.: 16/459,516

(22) Filed: Jul. 1, 2019

(65) Prior Publication Data

US 2020/0005682 A1 Jan. 2, 2020

Related U.S. Application Data

(63) Continuation of application No. 29/655,287, filed on Jul. 2, 2018.

(60) Provisional application No. 62/715,896, filed on Aug. 8, 2018.

(51) Int. Cl.
G09F 3/20 (2006.01)
H02G 3/08 (2006.01)
H01R 9/24 (2006.01)

(52) U.S. Cl.
CPC .......... *G09F 3/205* (2013.01); *H01R 9/2475* (2013.01); *H02G 3/081* (2013.01)

(58) Field of Classification Search
CPC ........ G09F 3/205; H01R 9/2475; H02G 3/081
USPC ....................................................... 174/112
See application file for complete search history.

(56) References Cited

U.S. PATENT DOCUMENTS

| | | | | |
|---|---|---|---|---|
| 2,625,759 | A * | 1/1953 | Frederick | H01R 13/465 40/654 |
| 2,710,382 | A * | 6/1955 | Fitzpatrick | H01R 13/4534 439/137 |
| 4,479,317 | A * | 10/1984 | Hanna | H01H 9/18 174/66 |
| 4,938,472 | A | 7/1990 | Gould et al. | |
| 5,212,899 | A | 5/1993 | Fandreyer | |
| 5,594,206 | A * | 1/1997 | Klas | H01H 9/18 174/56 |
| 5,693,911 | A * | 12/1997 | Sydow | H02G 3/14 174/66 |
| 8,636,222 | B2 * | 1/2014 | Vanderwel | G06K 19/0723 235/492 |
| 9,286,811 | B2 * | 3/2016 | Vanderwel | H01R 9/2475 |
| 2010/0005863 | A1 | 3/2010 | Askin et al. | |
| 2015/0279243 | A1 | 10/2015 | Willes | |

OTHER PUBLICATIONS

Wholesale Contractor Supply, "Electrical Boxes and Covers", 2018.

* cited by examiner

*Primary Examiner* — Timothy J Thompson
*Assistant Examiner* — Michael F McAllister
(74) *Attorney, Agent, or Firm* — William Simmons; Simmons Patents

(57) ABSTRACT

An apparatus for conveying information about a wiring system where said apparatus is configured for being associated with an "end-point" (such as an electrical box) and/or a device electrically associated with an end-point. The apparatus defines mechanical properties (such as a strain relief) and informational properties (such as an aluminum wiring warning).

11 Claims, 28 Drawing Sheets

WIRING INFORMATION DEVICE

CLAIM TO PRIORITY

This application is a continuation of U.S. application Ser. No. 29/655,287 filed on 2 Jul. 2018 and further claims priority to provisional application No. 62/715,896 filed on 8 Aug. 2018 of which the entire contents for all such references are hereby incorporated for all that they disclose for all purposes.

TECHNICAL FIELD

The invention relates to ornamental and utilitarian features of a system and apparatus for identifying/notifying people of electrical wiring conditions.

BACKGROUND OF THE INVENTION

Almost all residential wiring was initially made of copper due to its overall performance as a conductor associated with a feasible cost point. That said, aluminum has also been used for residential construction. Aluminum provides a better conductivity to weight ratio compared to copper which makes it a more attractive choice for power wiring in applications where weight is important (e.g. airplanes). Still, copper generally won the aluminum v. copper debate when all issues were considered. However, during the Vietnam War era (1960s through 1970s) the price of copper wiring reached at least triple the price of aluminum wiring tipping the aluminum v. copper choice in the favor of aluminum. Thus, the use of aluminum wiring became popular during such time.

Unfortunately, shortly after aluminum wiring became popular for use in residential homes, some problems started to appear. Such problems included flickering lights, warm cover plates on switches and receptacles, and burned insulation on wiring. Restated, there was an overheating issue which could lead to a fire. The problem was at the connections between the wiring system and the end-point (i.e. a light, receptacle, appliance etc.) where copper was still in use.

For electricity, resistance to current flow causes the generation of heat. Such is generally unwanted but cannot be avoided (only minimized). Notably, the best flow path is a continuous flow path with no interruptions as all interruptions have a higher resistance to current flow compared to a continuous wire. Thus, the ideal electrical path from a power source to a power user is a continuous wire. Obviously, a continuous flow path is not possible at the end-points (e.g. receptacles, switches, light fixtures, appliance connections, and at the power/breaker panel) where the power is made available. The best that can be done is to make the connections as low resistance as possible. Thus, the best connection is a "tight" connection where the wiring is clamped or soldered to (or both) the connection point (end-point).

For the residential wiring system, receptacles, switches, light fixtures, appliance connections, and power/breaker panel "connections" were designed for copper wiring. When aluminum wiring started being used as the wire that connected the breaker panel to a light fixture (for example—or some other end-point), such meant that aluminum wiring was being connected to end-points comprising copper and designed for connecting to copper wiring. A first problem with connecting aluminum wiring to a copper end-point is the use of dissimilar metals at the connections. The problem of connecting two different metals is that different metals have different rates of expansion. As the current in an electrical circuit (and thus, the connection) increases the temperature of the aluminum and copper increased but at different rates. Such had a tendency to make the connection loose over time. A loose connection is a higher resistance connection which caused even more heat generation at the connection which caused more expansion until the connection failed.

A second problem with using dissimilar metals relates to the chemical reaction between the two metals. When aluminum is connected to copper a chemical reaction called "oxidation" occurs. Oxidation causes a high-resistant connection, and as noted above, higher resistance means more heat which causes more oxidation which causes more heat, and so on, until the connection fails.

One solution to the aluminum/copper problems includes special connectors and wiring procedures. While modern technology makes it possible for the do-it-yourself electricians to work with aluminum wiring a necessary first step in such a process is to make the do-it-yourselfer (as well as professional electricians) aware of the issue. A second step is to educate the repair person about the proper process for connecting two different types of electrical wires. Finally, the repair person needs to acquire the proper products for connecting two different types of wire.

Embodiments of the current invention address at least the issues identified above.

SUMMARY OF THE INVENTION

Some of the objects and advantages of the invention will now be set forth in the following description, while other objects and advantages of the invention may be obvious from the description or may be learned through practice of the invention.

One object of the present invention is to provide an electrical wiring information device configured for a particular wiring system type.

Another object of the present invention is to provide a wiring information device to provide a notification/warning configured to notify a person working on a wiring system that a particular wiring issue is present and special procedures are required.

A further object of the present invention is to provide a wiring information device comprising a notification/warning configured to notify a person working on a wiring system that aluminum wiring is present and special procedures are required. The information device is further configured to provide at least one mechanical feature.

A further object of the invention is to provide for a wiring information device comprising novel ornamental features.

Additional objects and advantages of the present invention are set forth in the detailed description herein or will be apparent to those skilled in the art upon reviewing the detailed description. Also, it should be further appreciated that modifications and variations to the specifically illustrated, referenced, and discussed steps, or features hereof may be practiced in various uses and embodiments of this invention without departing from the spirit and scope thereof, by virtue of the present reference thereto. Such variations may include, but are not limited to, substitution of equivalent steps, referenced or discussed, and the functional, operational, or positional reversal of various features, steps, parts, or the like. Still further, it is to be understood that different embodiments, as well as different presently preferred embodiments, of this invention may include various combinations or configurations of presently disclosed features or elements, or their equivalents (including combinations of features or parts or configurations thereof not expressly shown in the figures or stated in the detailed description).

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which.

Figure 1:
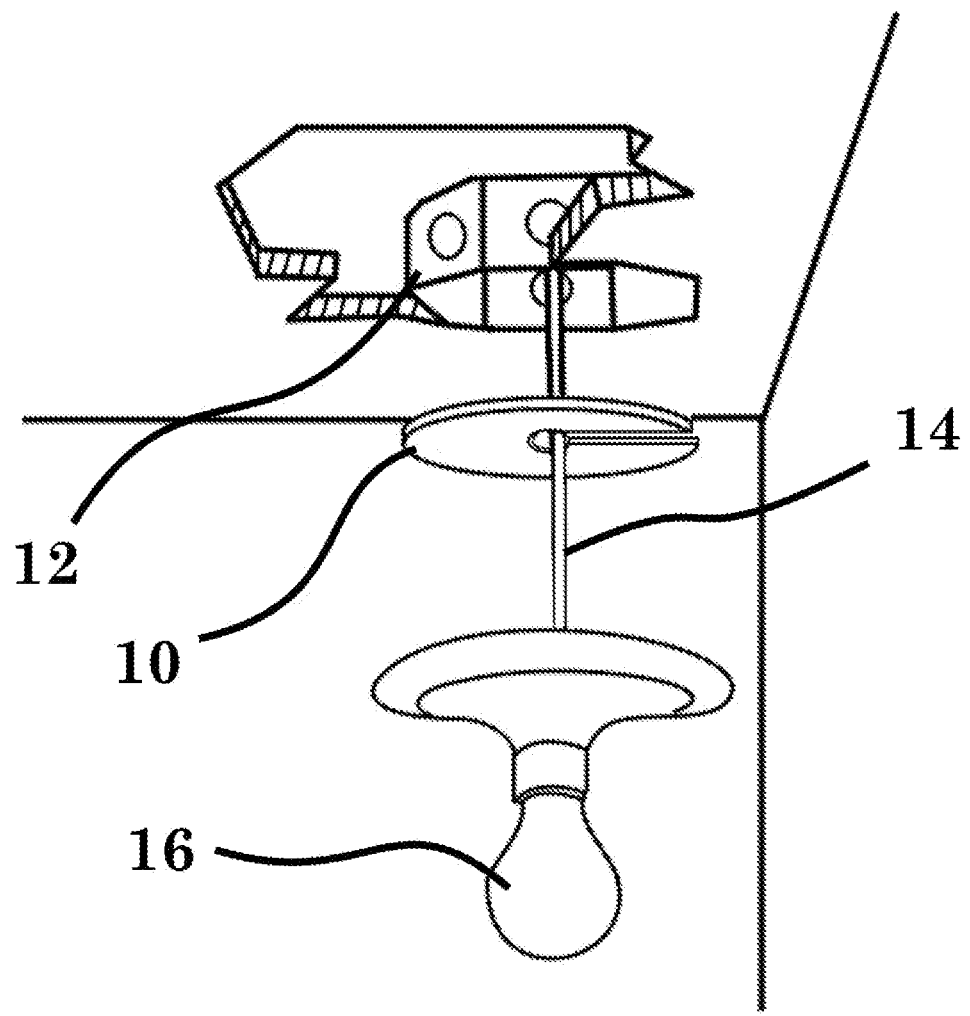
FIG. 1 shows one embodiment of a Wiring Information Device (WID) associated with an end-point comprising a light fixture.

Repeat use of reference characters throughout the present specification and appended drawings is intended to represent the same or analogous features or elements of the present technology. Various objects, advantages, and features of the invention will become apparent to those skilled in the art from the following discussion taken in conjunction with the drawings.

DISCLOSURE OF THE INVENTION

DETAILED DESCRIPTION

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeat use of reference characters is intended to represent same or analogous features, elements or steps. It is to be understood by one of ordinary skill in the art that the present discussion is a description of exemplary embodiments only and is not intended as limiting the broader aspects of the present invention.

Construction Aids

For the purposes of this document two or more items are "mechanically associated" by bringing them together or into relationship with each other in any number of ways including a direct or indirect physical "releasable connections" (snaps, screws, Velcro®, bolts, etc.—generally connections designed to be easily and frequently released and reconnected), "hard-connections" (welds, glue, rivets, macular bonds, generally connections that one does not anticipate disconnecting very often if at all and that are "broken" to separate), and/or "moveable connections" (rotating, pivoting, oscillating, etc.).

Similarly, two or more items are "electrically associated" by bringing them together or into a relationship with each other in any number of ways including: (a) a direct, indirect or inductive communication connection, and (b) a direct/indirect or inductive power connection. In addition, while a drawing or image may depict a particular electrical association as a single line, such a connection may represent a plurality of wired connections or cables comprising multiple conductors as required for the application of interest. An electrical association includes any and all of the above.

As used herein, unless stated otherwise, the terms "first," "second," and "third" may be used interchangeably to distinguish one component from another and are not intended to signify location or importance of the individual components.

As used herein, the terms "upstream" and "downstream" refer to the relative location of components in a substance flow pathway. For example, component A is upstream of component B if a substance flows from component A to component B. Conversely, component B is downstream of component A if component B receives a substance flow from component A. The substance flowing may be a fluid or electrical current.

As used herein, the term "axial" refers to a direction of flow through an object; the term "radial" refers to a direction extending away from the center of an object or normal to the "axial" direction, and the term "circumferential" refers to a direction extending around the circumference or perimeter of an object.

For the purposes of this document, unless otherwise stated, the phrase "at least one of A, B, and C" means there is at least one of A, or at least one of B, or at least one of C or any combination thereof (not one of A, and one of B, and one of C).

This document includes headers that are used for place markers only. Such headers are not meant to affect the construction of this document, do not in any way related to the meaning of this document nor should such headers be used for such purposes.

While the examples below are directed mainly to electrical systems comprising aluminum wiring, the disclosed technology may be used by any type of electrical system.

DESCRIPTION

Figure 2:
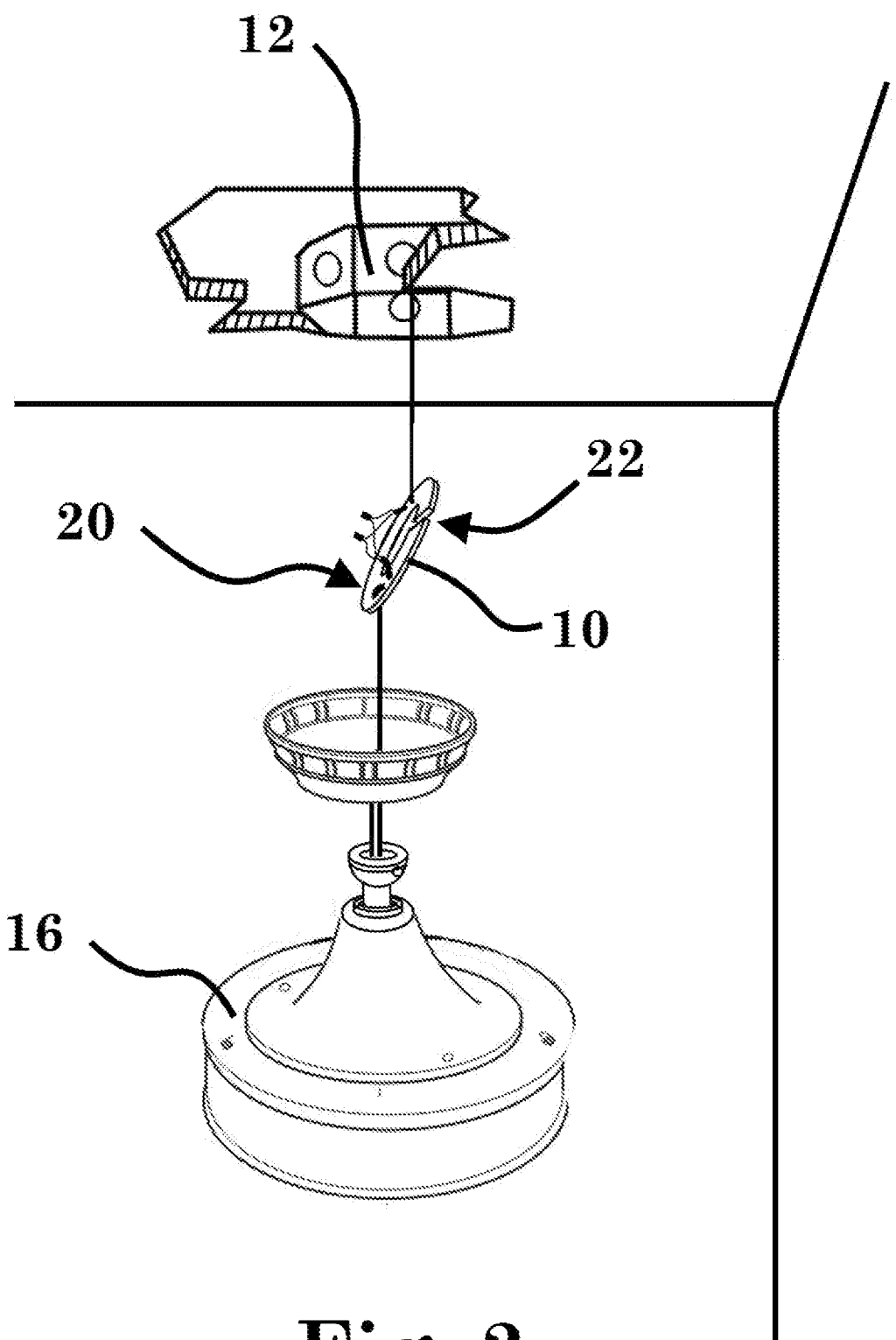
FIG. 2 illustrates a WID configured with a strain relief function further defining a support function associated with an end-point comprising a ceiling fan.

Referring now more particularly to FIG. 1 and FIG. 2, one exemplary embodiment of a Wiring Information Device (WID) (10) configured to be associated with an electrical end-point (12) is presented. For the embodiment in FIG. 1, WID (10) is simply a plate configured to be associated with wiring (14) so that it fits between the electrical end-point (12) and electrical device (16). As disclosed in detail below, the WID (10) provides an information function (18, FIG. 3) related to wiring (14) and/or an electrical device (16). One such information function is a warning that the wiring (14) comprises aluminum and such information function (18) may further include an electronic address (e.g. an URL) to an information source (e.g. website) where more information can be located related to the warning. The WID (10) depicted in FIG. 2 further defines a mechanical function (20) such as a strain relief/support (36, FIG. 3, FIG. 4) function which is defined in more detail below. The WID (10) defines an optional gap (22) that allows WID (10) to be associated with a wiring system without the need for disconnecting the electrical device (16) from the end-point (12).

One of ordinary skill in the art will appreciate that an electrical end-point (12) is simply a point where electrical power is delivered and may be used by an electrical device (16) and include receptacles, switches, and power/breaker/fuse boxes. Embodiments of electrical devices (16) include typical household appliances, light fixtures, ceiling fans and any device powered by electricity and configured to be connected to a power grid. For some applications, it is possible the "electrical end-point" (12) is defined by the electrical device (16) for directed wired devices.

Figure 3:
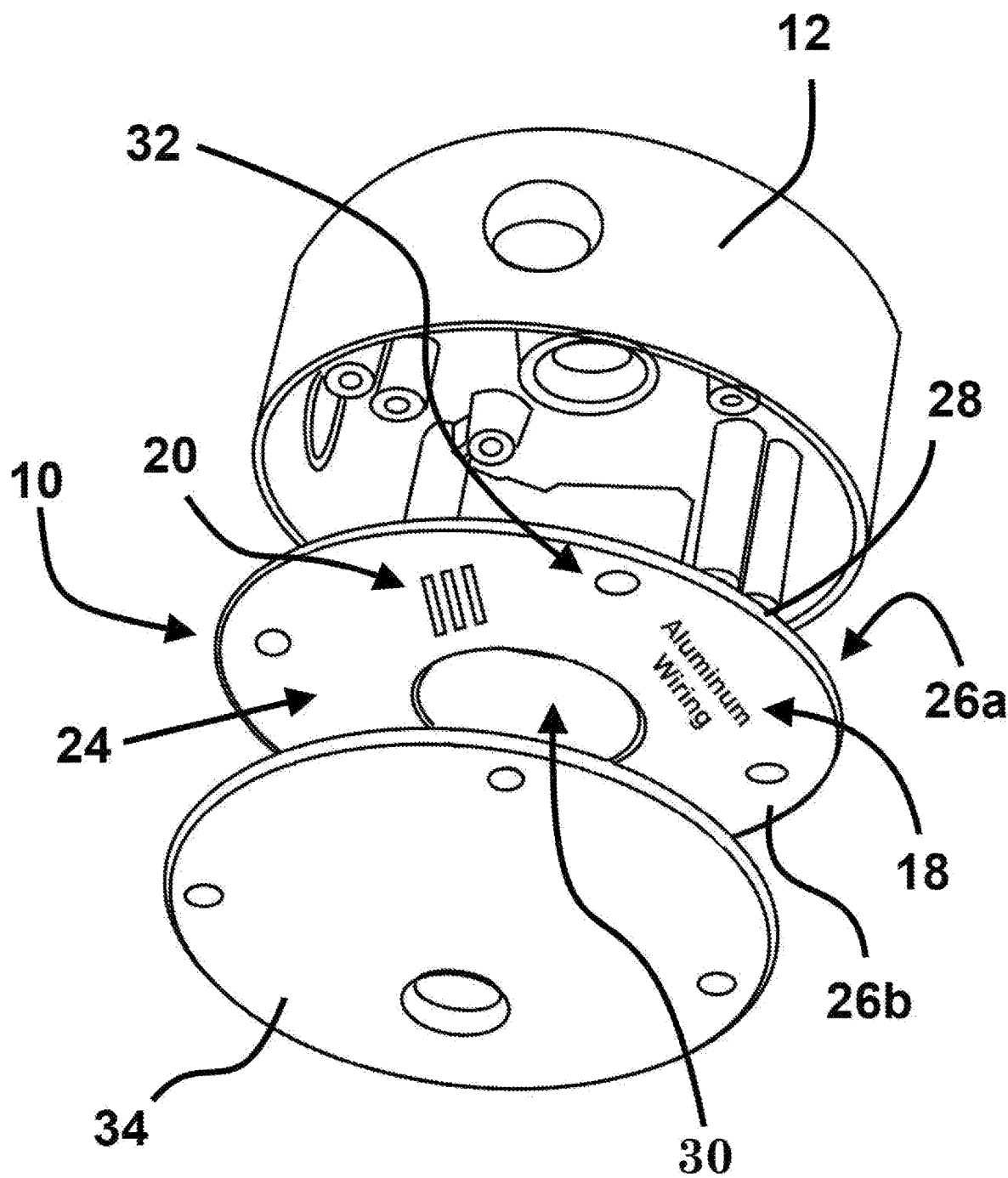
FIG. 3 illustrates an exemplary WID device comprising at least one mechanical property and at least one informational property.
Figure 4:
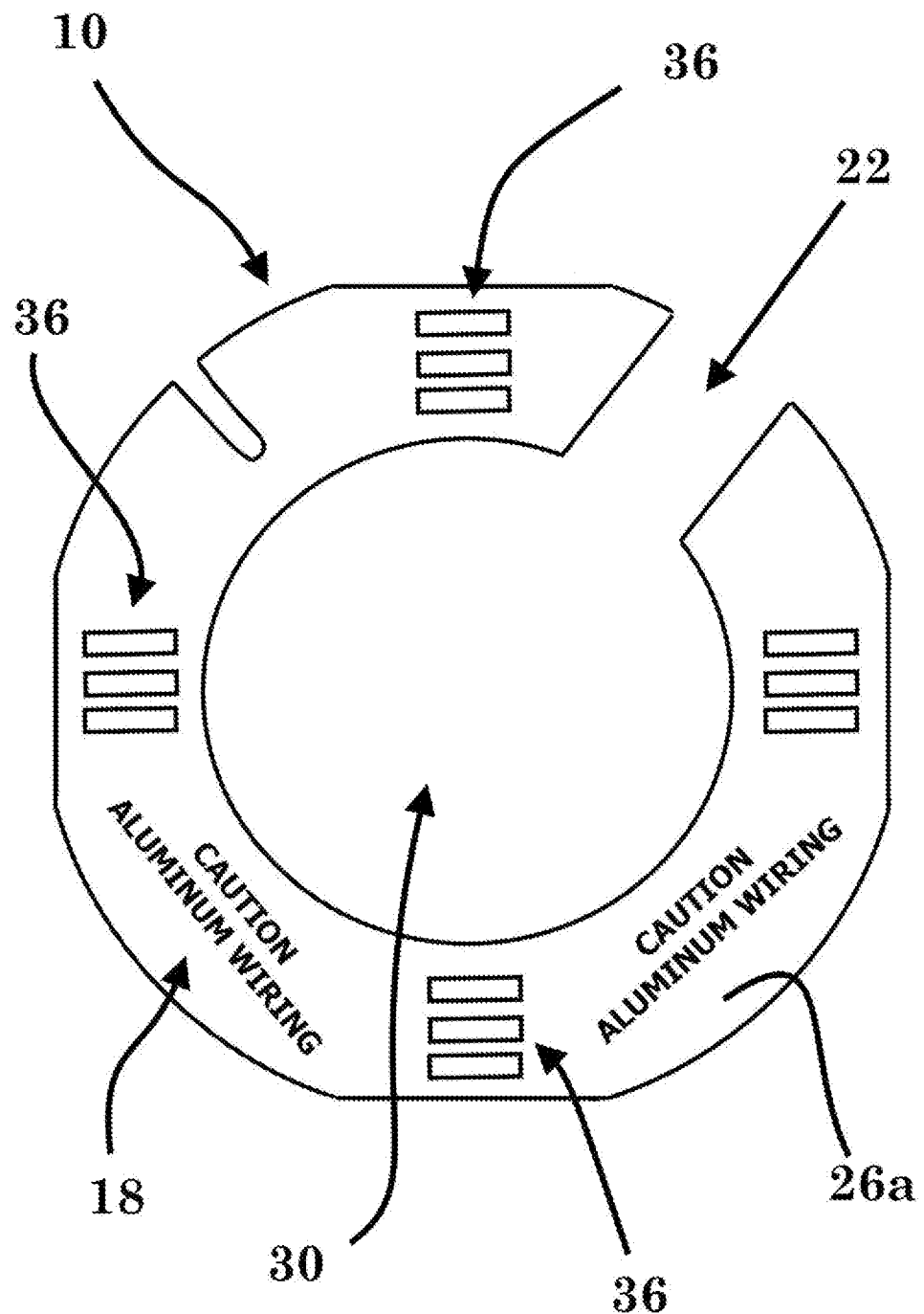
FIG. 4 presents a top plan view of a WID device defining a plurality of strain relief/support elements.
Figure 5:
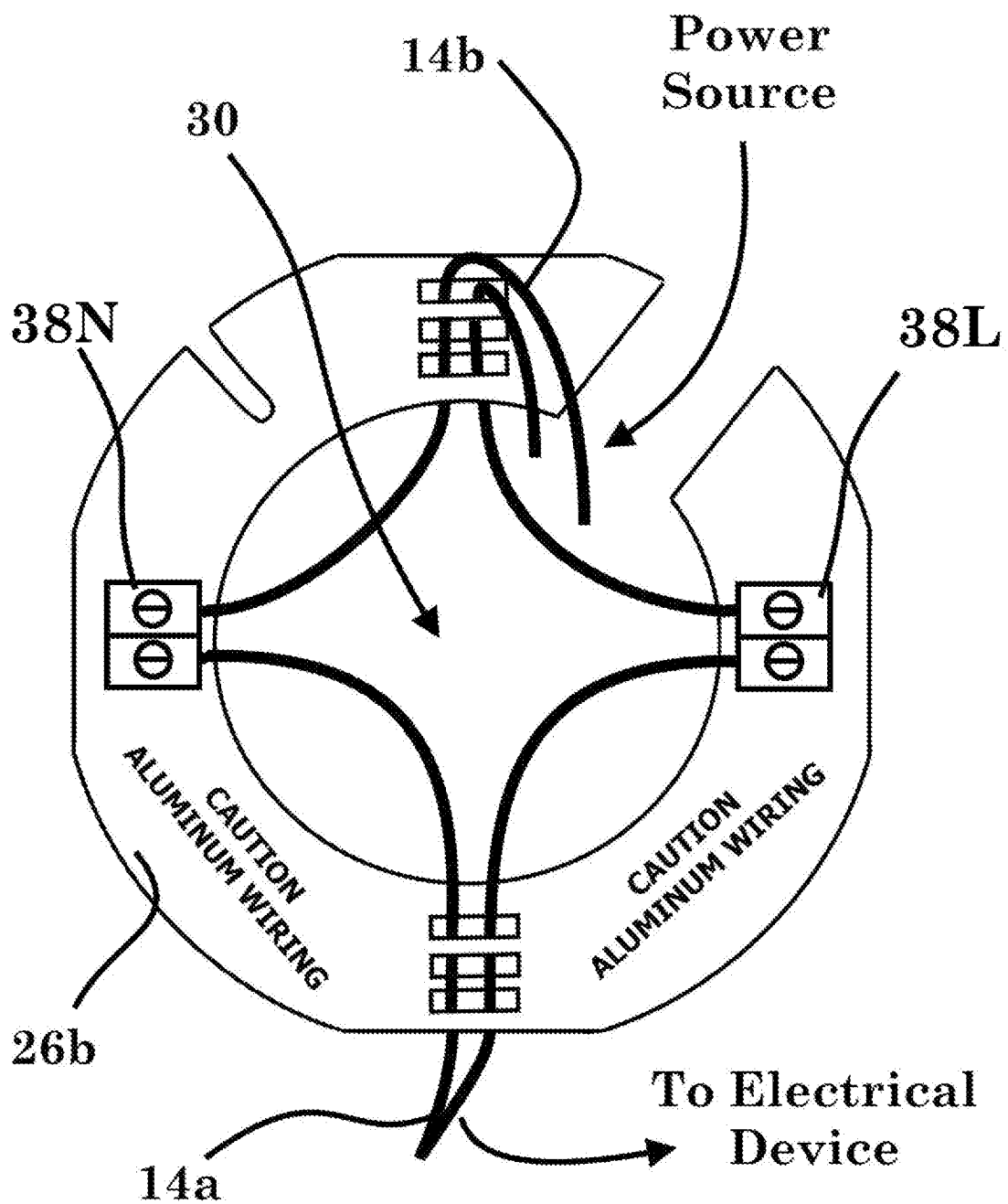
FIG. 5 presents a bottom plan view of FIG. 4 defining two adapters configured for electrically associating two dissimilar wires.

Referring now more particularly to FIG. 3, FIG. 4 and FIG. 5, one exemplary embodiment of a WID (10) comprises a body (24) defining a pair of opposed faces (26a, 26b, referred to collectively as 26) connected by a peripheral edge (28). The body (24) defines at least one void (30) therethrough thereby defining an outer perimeter and at least one inner perimeter. The outer perimeter defines a first polygonal shape and the at least one inner perimeter defines a second polygonal shape which may be similar to the first polygonal shape. For the purposes of this document, a circle is a polygon (technologically, the perimeter of a polygon should be continuous, thus, for embodiments comprising a gap 22 the perimeter is considered the same as the perimeter for embodiments with no gap). While the WID (10) depicted in FIG. 3 defines a second polygonal shape that is similar but smaller than the first polygonal shape such is not required. Restated, the second polygonal shape may be different compared to the first polygonal shape. For the current exemplary embodiment, the first polygonal shape is substantially the same as the perimeter defined by the interface point of the end-point (12) which is a round electrical box for this example. Such allows the WID (10) to provide at least one of the following mechanical properties: (1) a gasket, (2) an insulator and (c) a secured strain relief. A "secured strain relief" for this document is a WID (10) comprising a strain relief component (20) and further comprising mounting points (32, FIG. 3) that can be used to secure the WID (10) to the end-point (12) so that the WID (10) is secured to the end-point (12) as compared to an embodiment where WID (10) is not secured to the end-point ("floats" free). The strain relief function depicted in FIG. 2 is also useful as a way of supporting an electrical device (16) while wiring connections are made.

For the embodiment depicted in FIG. 3, the body (24) is configured for being associated with an electrical end-point (12) by fitting between an end-point plate (34) and an end-point electrical box and secured in place by mounting elements (e.g. screws) that extend through holes (32) defined by the WID (10).

Mechanical Properties

The WID (10) is further configured to provide a first mechanical property (20) and an informational property (18) related to a wiring system associated with end-point (12). The mechanical properties include: (a) strain relief, (b) gasket, (c) insulator, (d) grounding point, and (e) support. Notably, the WID (10) may be constructed from an insulator such as plastic or a conductor such as metal or both using a plurality of materials. When the WID 10 is constructed with both insulating materials and conductive materials the WID can define both an insulator function and a conductor function. For example, the center portion may be an insulator (to reduce the risk of shoring the wiring passing through the WID and the out portion may be a conductor to providing a grounding point.

As best seen in FIG. 2 and FIG. 5, one mechanical property is a strain relief (38). Such strain relief is simply a plurality of slots defined through the opposed faces (26) that allow the wiring (14) to be "weaved" through the slots so that wiring (14) will not easily pull back through such slots. The embodiment depicted in FIG. 5 shows 3 slots but one of ordinary skill in the art will appreciate only two slots may be used as well as more than three slots. The slots may be sized to receive a cable comprising a plurality of wires or one or more single wires as depicted in FIG. 5. Further, any void shape can be used to define the strain relief such as a plurality of round holes instead of slots.

For the exemplary embodiment depicted in FIG. 5, an adapter (38) is associated with at least one of the opposed faces (26) and is configured for electrically associating dissimilar wires such as aluminum and copper wires. A first adapter (38L) is configured for receiving the "Line" conductors. A first port X is configured to receive an aluminum "Line" wire from the power source and a second port Y is configured to receive a copper "Line" wire from an electrical device (16). Port X and Port Y are electrically connected; thus, the aluminum Line wire will also be electrically connected to the copper Line wire. A second adapter (38N) is configured for receiving the "Neutral" conductors in a similar manner. Notably, for almost all installations, the Line wire is black and the Neutral wire is white. Thus, for one embodiment, the first adapter (38L) defines a black color and the second adapter (38N) defines a white color. The informational properties defined by the WID (10) may include a torque value for embodiments where the adapter (38) comprises a clamping screw designed to be secured at a particular torque value.

One of ordinary skill in the art will appreciate that the WID (10) embodiment depicted in FIG. 5 defines a first mechanical property comprising a strain relief function, a second mechanical property comprising an wiring adapter function, and may define a third mechanical property providing a support function if the strain relief is configured properly and at least one of a fourth and fifth mechanical property comprising at least one of an insulator and conductor function depending on the material used to form the WID (10) body.

Informational Properties

As noted above, the WID (10) is configured to provide at least one informational property (18) related to a wiring system or an electrical device associated with an end-point (12). The informational properties include: (a) a color associated with or defined by at least one of the opposed faces, (b) writing/text presenting a message (such as a message about the wiring), (c) writing/text presenting a message about the electronic device (16) electrically associated with the wiring (14), (d) a torque value (e.g. for tightening the lugs of adapter 38), and (e) a writing/text presenting an electronic address for locating an information source on a remote system (such as a website accessed through the Internet).

For embodiments of the WID (10) that comprise an adapter (38) comprising lugs to be tightened with a tool, the at least one surface (26) may define a torque value. For example, for one embodiment the adapter (38) is a terminal block comprising a plurality of terminals where each terminal is configured to receive a wire. Each terminal further defines a screw that is tightened to clamp the wire into the terminal block. Exemplarily preferred torque amounts are between 22 lb-ft and 24 lb-ft of torque. For one embodiment such values are provided by at least one surface of opposed faces (26).

Figure 6:
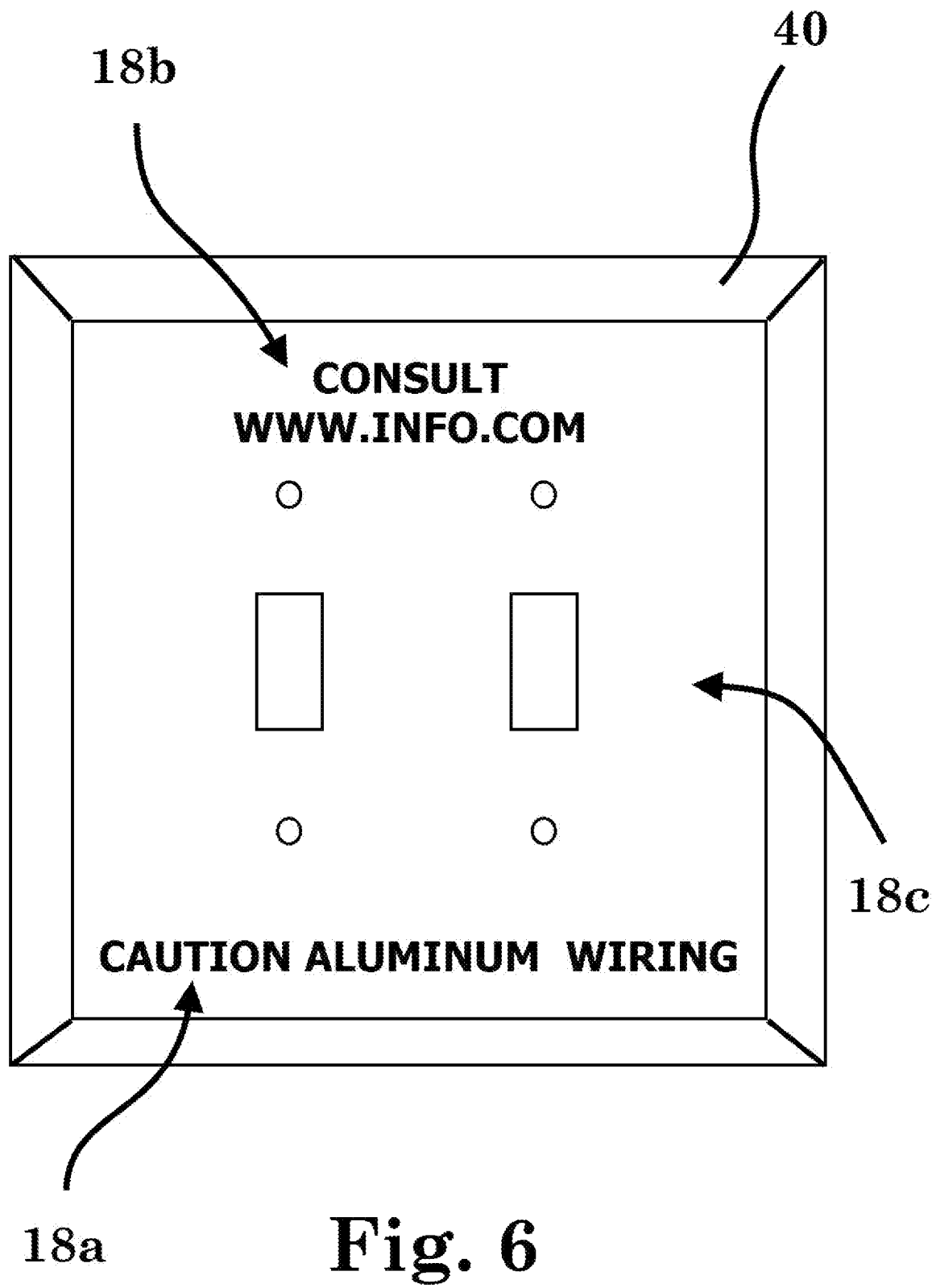
FIG. 6 presents a rear/back side plan view of a light switch plate showing informational properties.
Figure 7:
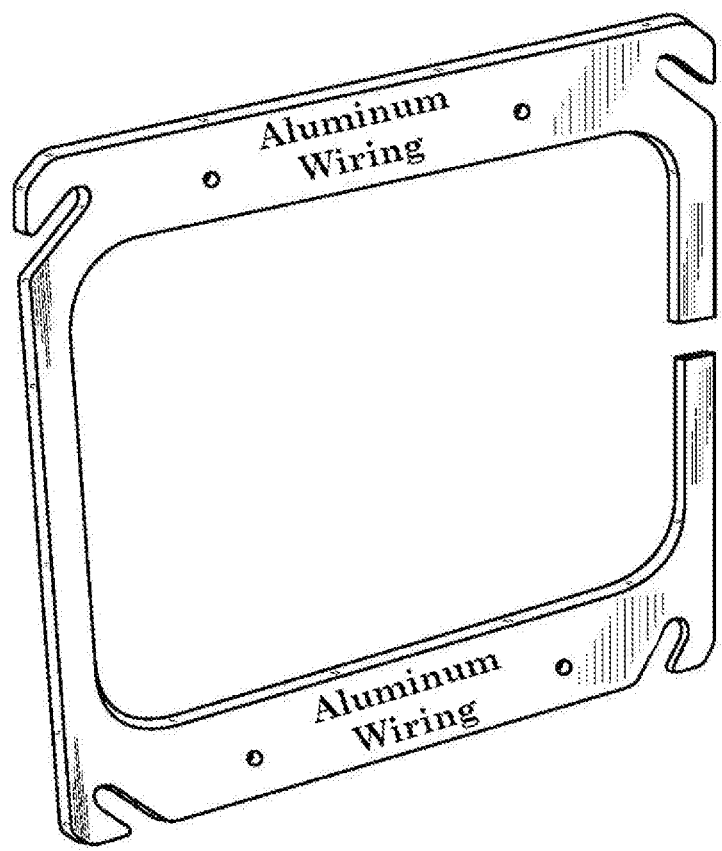
FIG. 7 is an elevated front perspective view presenting ornamental features for a WID.
Figure 8:
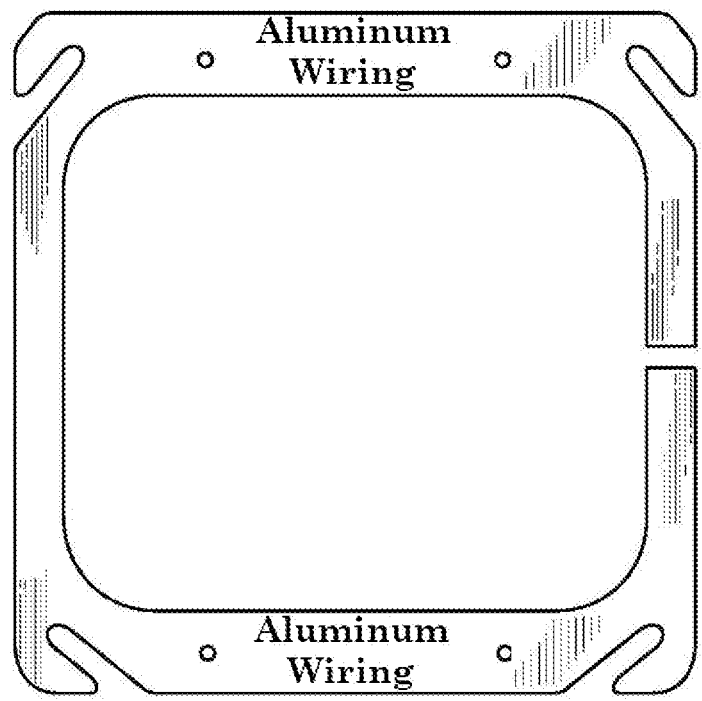
FIG. 8 is a front plan view thereof.
Figure 9:
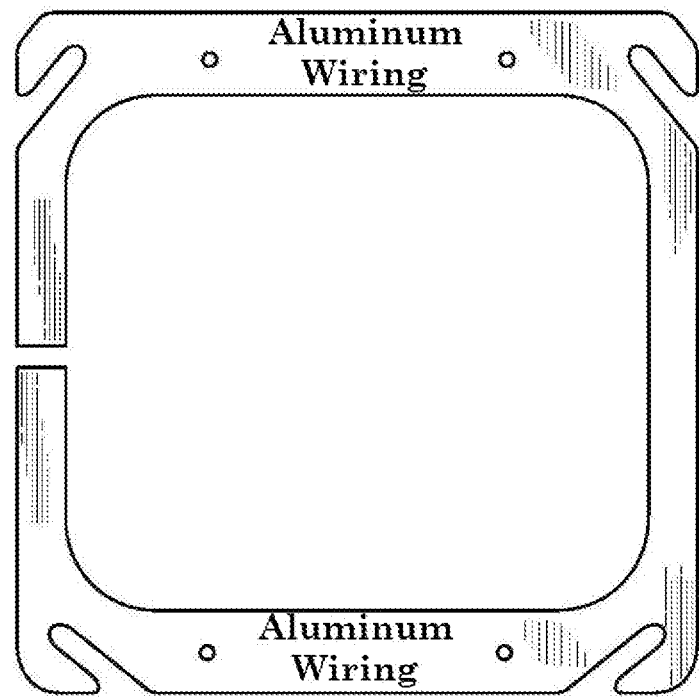
FIG. 9 is a back plan side view thereof.
Figure 10:
FIG. 10 is an elevational right side view thereof.
Figure 11:
FIG. 11 is an elevational left side view thereof.
Figure 12:
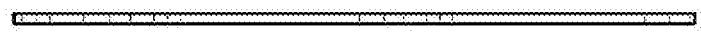
FIG. 12 is a bottom side view thereof.
Figure 13:
FIG. 13 is a top side view thereof.
Figure 14:
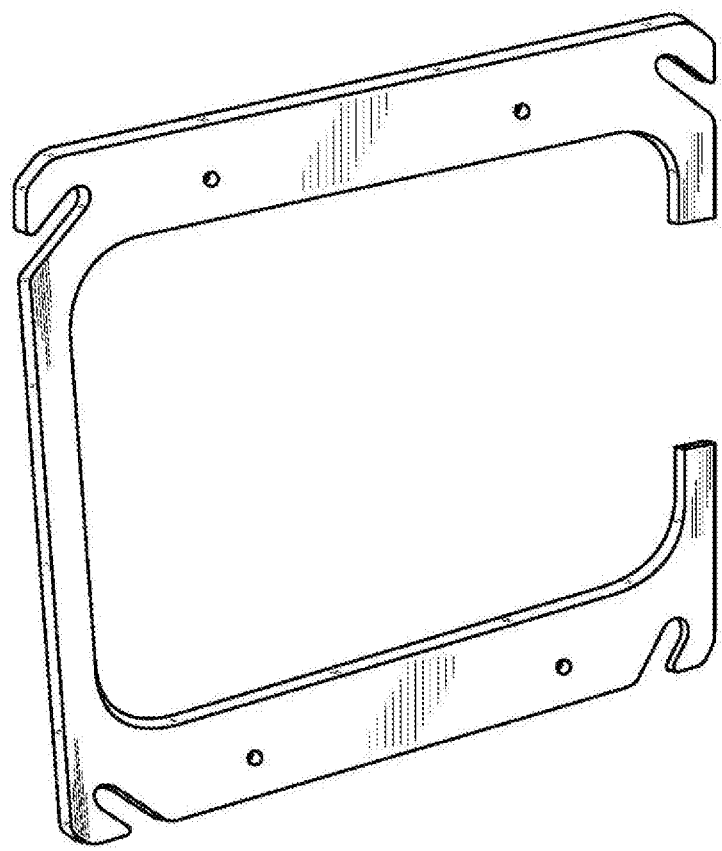
FIG. 14 is an elevated front perspective view of a wide gap version thereof.
Figure 15:
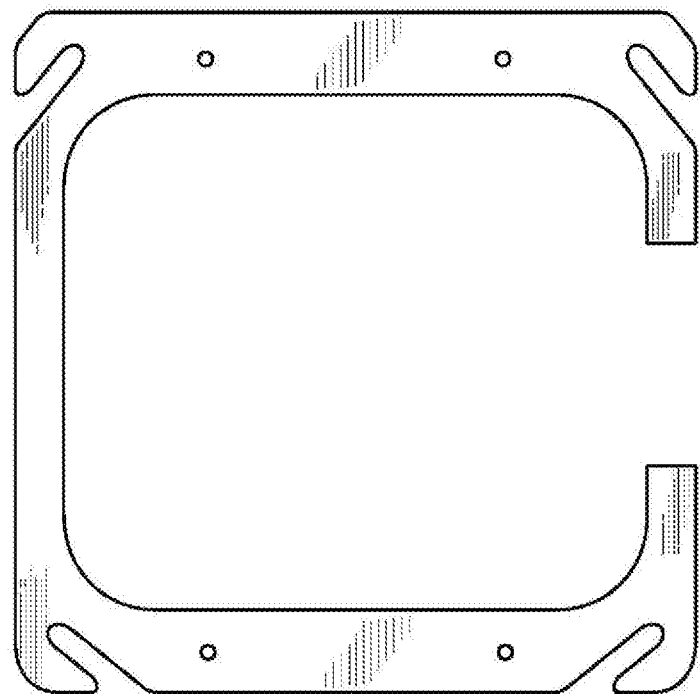
FIG. 15 is a front plan view thereof.
Figure 16:
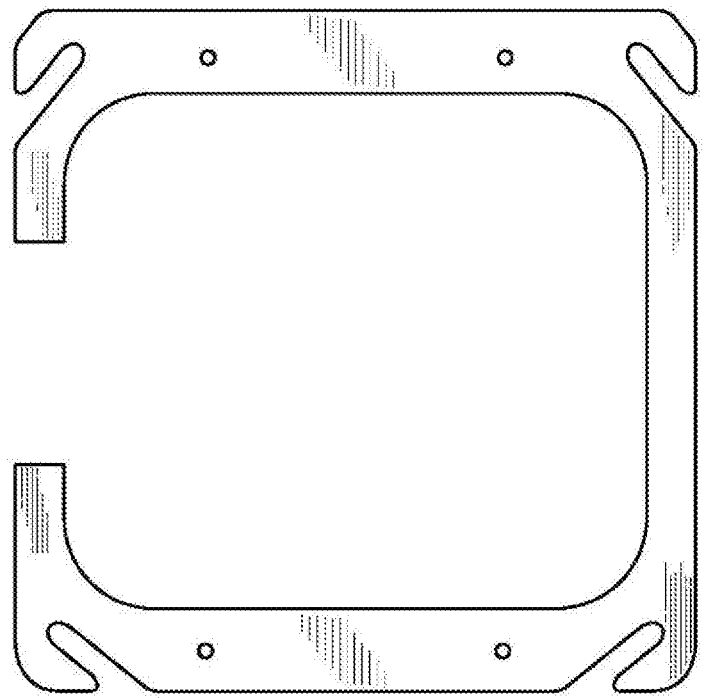
FIG. 16 is a back plan side view thereof.
Figure 17:
FIG. 17 is an elevational right side view thereof.
Figure 18:
FIG. 18 is an elevational left side view thereof.
Figure 19:
FIG. 19 is a bottom side view thereof.
Figure 20:
FIG. 20 is a top side view thereof.
Figure 21:
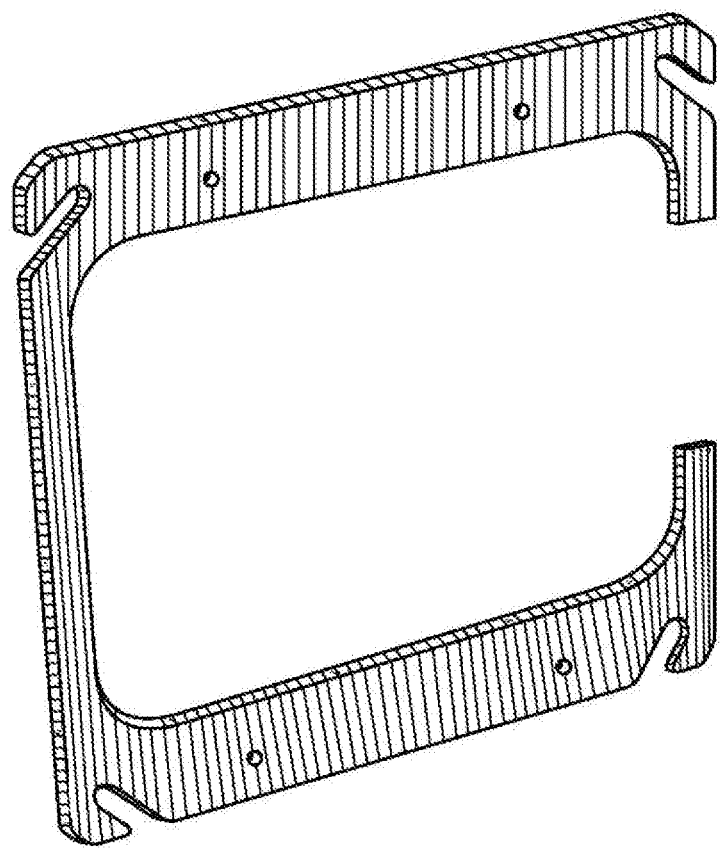
FIG. 21 is an elevated front perspective view of a shaded version thereof.
Figure 22:
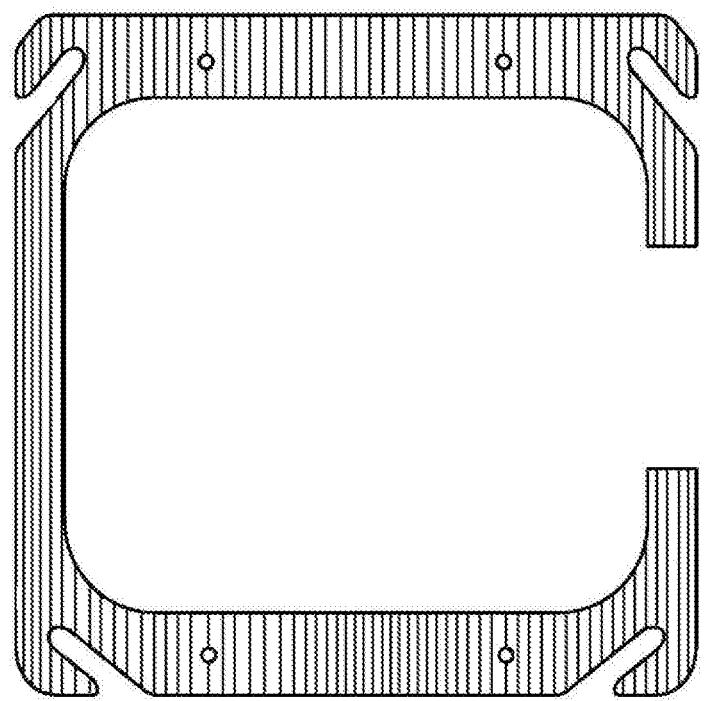
FIG. 22 is a front plan view thereof.
Figure 23:
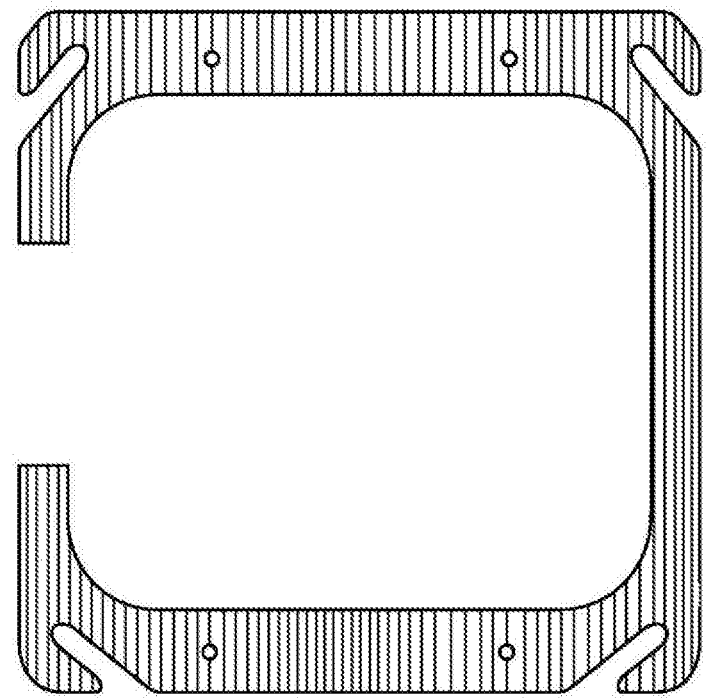
FIG. 23 is a back plan side view thereof.
Figure 24:
FIG. 24 is an elevational right side view thereof.
Figure 25:
FIG. 25 is an elevational left side view thereof.
Figure 26:
FIG. 26 is a bottom side view thereof.
Figure 27:
FIG. 27 is a top side view thereof.

Referring now to FIG. 6, the inside surface of an exemplary switch plate (40) is presented. For the example in FIG. 6, the switch plate (40) defines three informational properties (18a, 18b, 18c), comprising a caution indicating aluminum wiring is present and an electronic address for locating a website for more information and a color (18c) defined by or associated with the inside surface of the switch plate (40). Such a website would ideally have information about how to safely connect aluminum wiring to copper wiring. Such a website may further contain information (contact information, references, reviews, etc.) about entities who supply aluminum wiring services and products that can be used and where to hire/purchase same. The inside surface (18c) may be further color-coded (see FIG. 21-FIG. 28 for examples) to alert a person to the presence of associated text-based messages and the presence of a condition such as aluminum wiring.

Wiring Label System

Figure 36:
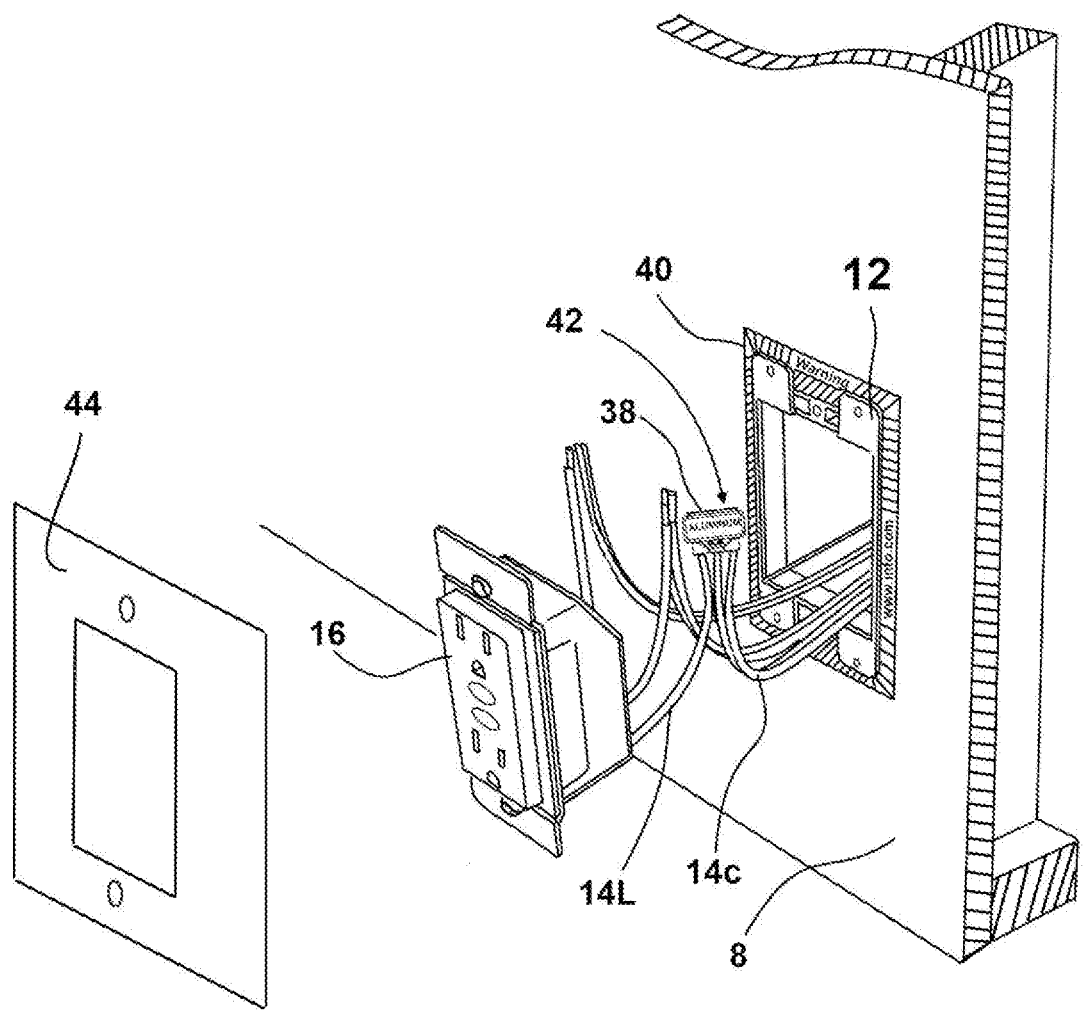
FIG. 36 is a perspective view of a sticker embodiment of the invention.
Figure 37:
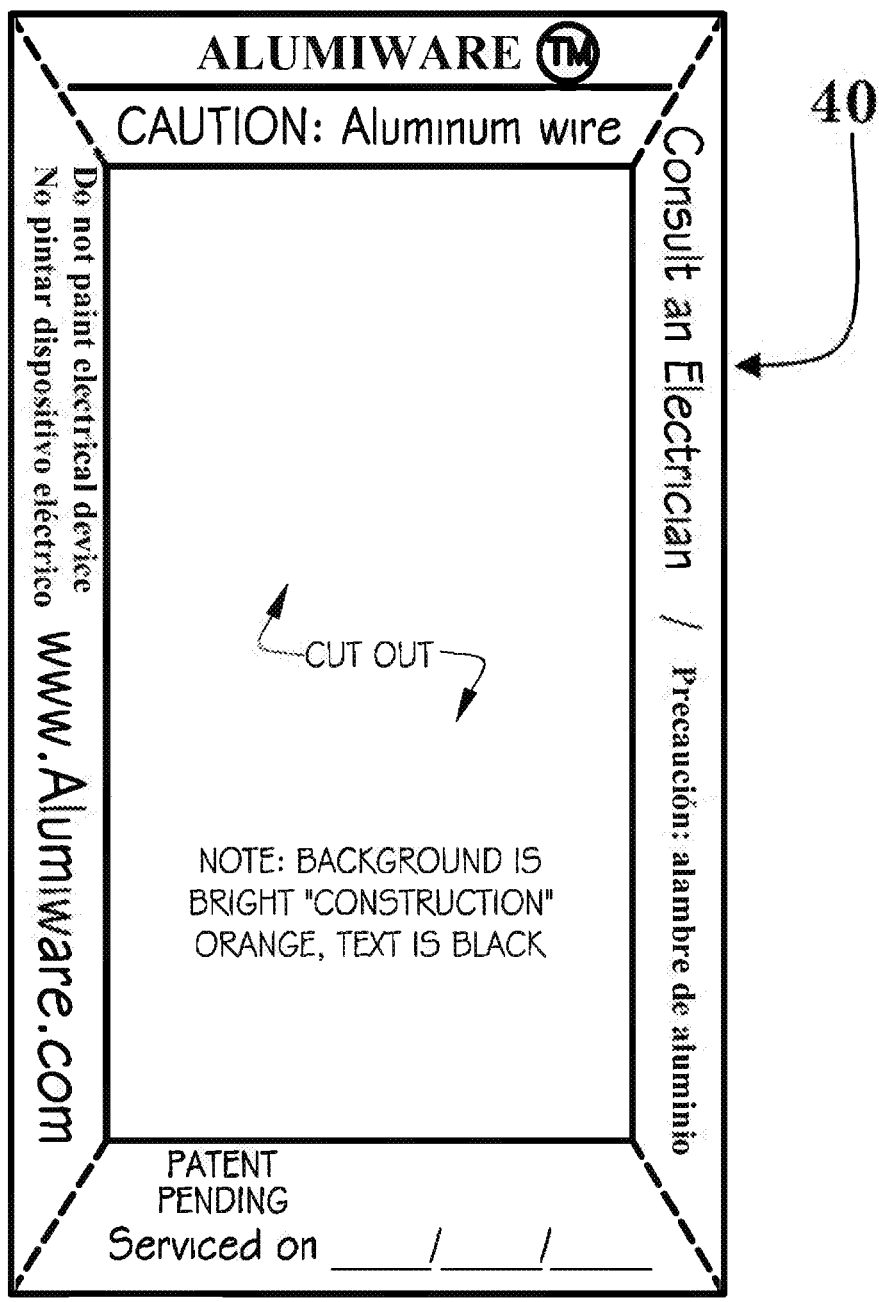
FIG. 37 is a view of a WID device defining a label for associating with a rectangular electrical box.

Referring now more particularly to FIGS. 36 and 37, a wiring labeling system version of the WID (10) is presented.

As depicted in FIG. 36, the WID (10) system is configured to be associated with an electrical end-point (12) and comprises an end-point label (40) defining an ep-label outer perimeter and an ep-label inner perimeter configured for being associated with an end-point (12). The end-point (12) is an electrical box configured to receive outlet (16) and cover pate (44). The end-point label (40) provides an information function related to the electrical wiring (14c) associated with the end-point (12). The end-point label (40) may be associated with either a support surface such as a wall (8) (e.g. wall, ceiling, etc.), the cover plate (44) or the end-point (12) device such as the electrical box. For one embodiment, the end-point label defines a sticker although any suitable means for associated a label to another object may be used. The ep-label (40) provides an information function as described above which may include color coding of the sticker surface as well as a text-based message (the lines on the surface of end-point label (40) in FIG. 36 may be replaced by shading/color and both may be used).

For the embodiment depicted in FIGS. 36 and 37, the end-point label (40) is configured to be associated with a support surface (wall 8) associated with said electrical box (12) so that the ep-inner perimeter surrounds said electrical box (12). For one embodiment, the ep-label outer perimeter is similar to but smaller than the cover plate (44) outer perimeter so that the ep-label (40) cannot be seen when the cover plate (44) is mechanically associated with the electrical box (12). Alternatively, the end-point label (40) is configured to be associated with the inner surface of the cover plate (44) similar to the configuration depicted in FIG. 6.

The example depicted in FIG. 37 comprises a website address (URL) where more information about the wiring issues can be located, includes English and Spanish cautions, advises a person to consult an electrician, comprises a "do not paint" warning requesting a painter to not paint over the label, and provides a space for dating when the label was applied to the end-point indicating the last time such end-point had been serviced.

The WID (10) system further comprises a connection point label (42) configured for being associated with a connection point (38) configured to electrically associate two dissimilar wires. As described earlier for the information function, the connection label provides at least one of (a) a text-based warning element configured to be associated with a surface of said connection point (38) and (b) a tie wrap device configured the wires (14c and 14L) associated with the connection element (38). As depicted in FIG. 36, the connection point label is either a sticker or text associated with a surface of connection element (38). Such the connection point label (42) comprises the text "Aluminum" and would ideally be color-coded to match end-point label (40) surrounding the end-point (12). It should be appreciated that the adapter (38) will be small minimizing the amount of text that can be placed on such adapter (38). By coordinating the colors between the end-point label (40) and the connection point label (42) a repair person is more likely to associate the two warnings allowing a more detailed message to be conveyed to the repair person.

Ornamental Features

Figure 28:
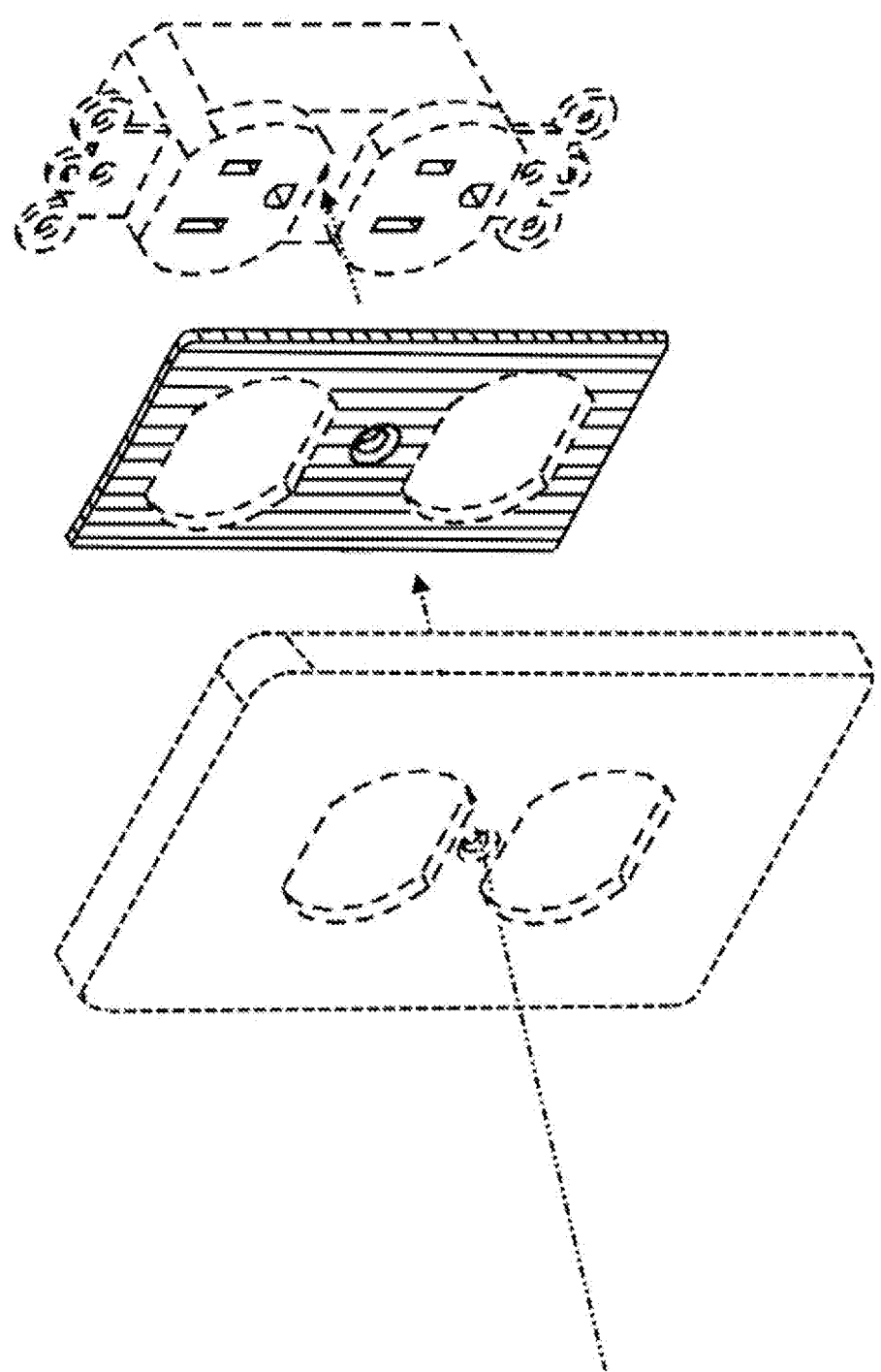
FIG. 28 is an elevated front perspective view of a shaded second embodiment thereof.
Figure 29:
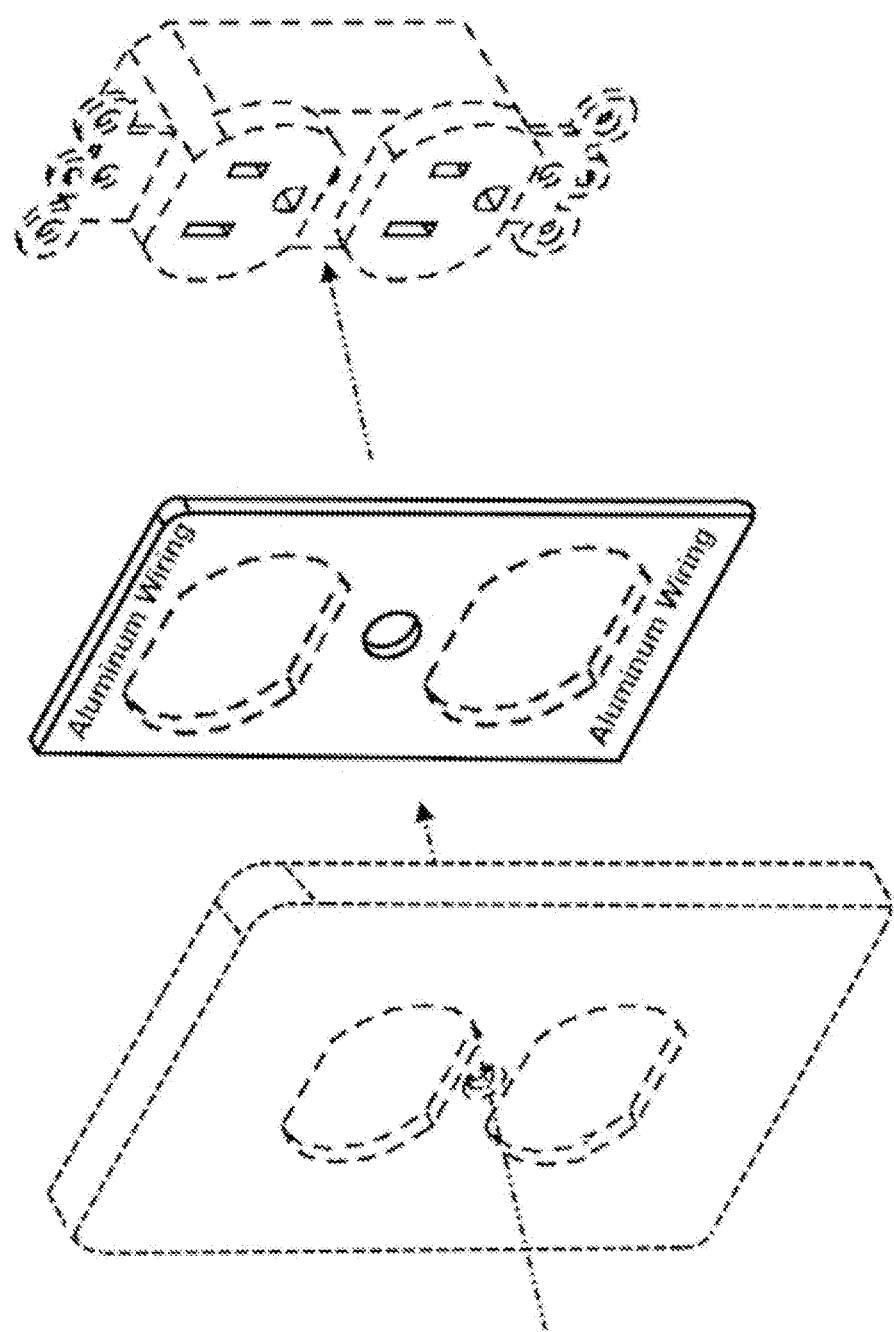
FIG. 29 is an elevated front perspective view of an unshaded second embodiment thereof.
Figure 30:
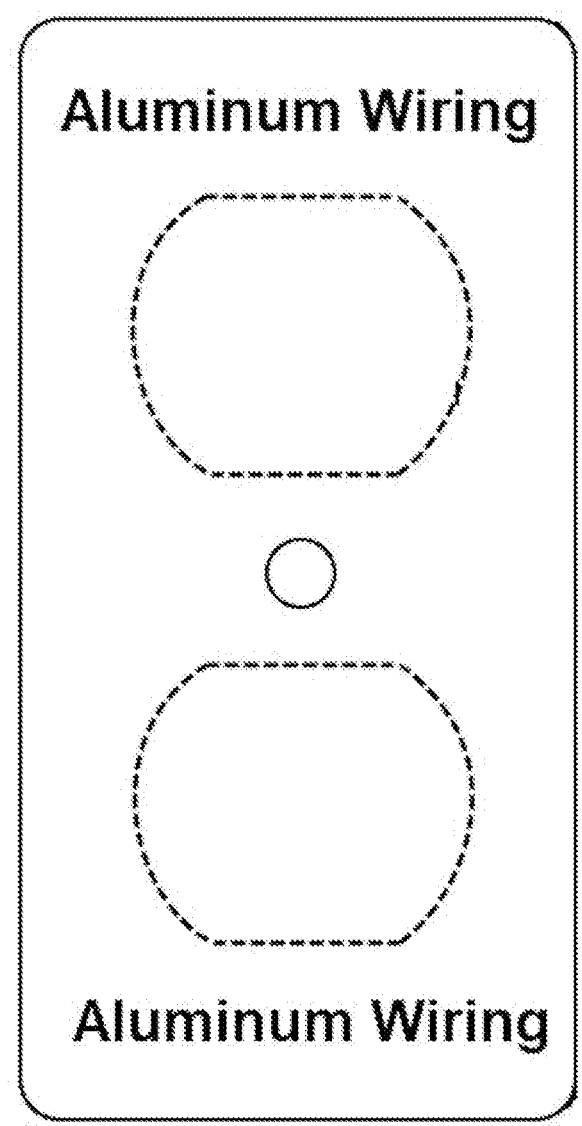
FIG. 30 is a front plan view thereof.
Figure 31:
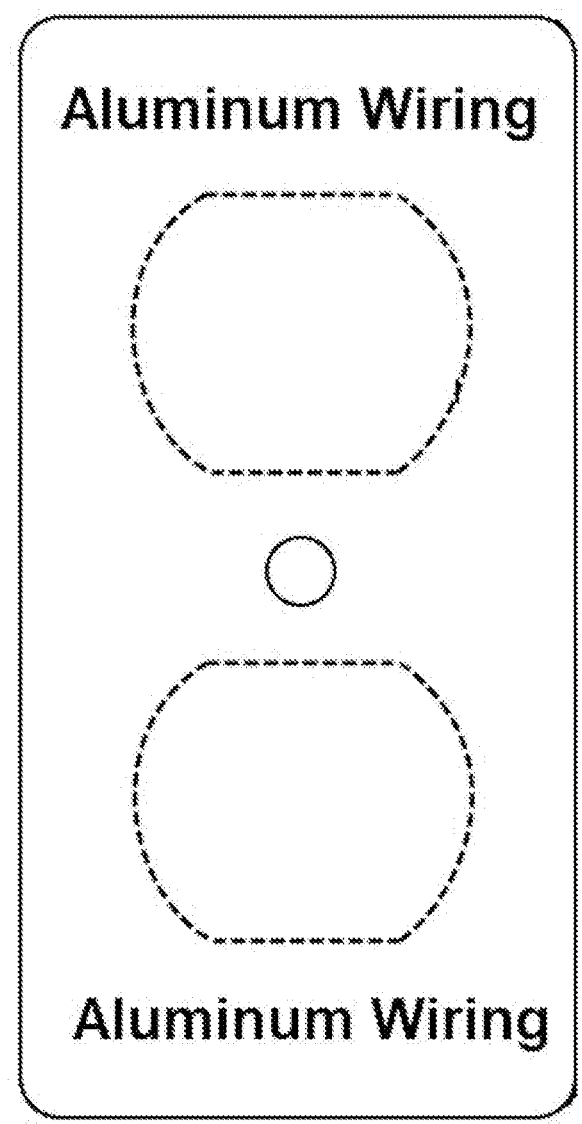
FIG. 31 is a back plan side view thereof.
Figure 32:
FIG. 32 is an elevational right side view thereof.
Figure 33:
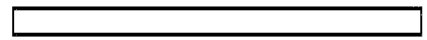
FIG. 33 is an elevational left side view thereof.
Figure 34:
FIG. 34 is a bottom side view thereof.
Figure 35:
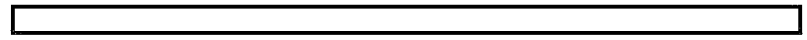
FIG. 35 is a top side view thereof.

Referring now to FIG. 7 through FIG. 35, ornamental features of embodiments of a WID (10) is presented. For FIG. 7-13, the WID (10) is a rectangular plate with a small gap (22). The surface of WID (10) provides an information function in text form as described above. Similarly, FIG. 14 through FIG. 27 provide a rectangular plate with a larger gap and where the surface defines a shading to provide the information function. FIG. 38-35 provide a WID (10) device shaped similar to an outlet cover and configured to fit between an outlet cover and outlet. The WID (10) may have a shaded surface as depicted in FIG. 28 and/or a text-based message as depicted in FIG. 30.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A wiring information device configured to be associated with an electrical end-point, said wiring information device comprising:
    a body configured for being associated with an electrical end-point defining an end-point perimeter wherein said body defines a pair of opposed faces connected by a peripheral edge and wherein said opposed faces define at least one hole therethrough so that said opposed faces define a body outer perimeter and at least one body inner perimeter wherein said body outer perimeter defines a first polygonal shape and said at least one body inner perimeter defines a second polygonal shape;
    a first mechanical property defined by said body comprising one of (a) a gasket wherein said first polygonal shape matches the end-point perimeter or (b) an insulator wherein said first polygonal shape is equal to or smaller than the electrical end-point perimeter;
    a second mechanical property defined by said body comprising a support function configured to support a device being connected to electrical end-point; and
    wherein said body further defines an informational property comprising an aluminum wiring warning.

2. A wiring information device as in claim 1, wherein said second mechanical property comprises an electrical connector for electrically associating two dissimilar metals.

3. A wiring information device as in claim 1, wherein the end-point is configured for receiving a residential electrical outlet and said second polygonal shape defined by said body is sized to allow access to the electrical outlet and wherein said aluminum wiring warning comprises at least one of (a) a color defined by at least one of said opposed faces or (b) text associated with at least one of said opposed faces.

4. A wiring information system configured to be associated with an electrical end-point comprising aluminum wiring, said wiring information system comprising:
    an end-point (ep) label defining an ep-label outer perimeter and an ep-label inner perimeter configured for being associated with an electrical end-point comprising an electrical box associated with a cover plate wherein said end-point label is configured to be associated with one if (a) a support surface associated with the electrical box so that the ep-inner perimeter surrounds said electrical box or (b) the electrical box or (c) configured to be associated with an inner surface of said cover plate;
    an aluminum wiring warning defined by said ep-lable; and
    a connection point label configured for being associated with a connection point configured to electrically associate two dissimilar wires wherein said connection point label is a tie wrap device configured with a warning element configured to be associated with at least one of the connection element or the wires associated with the connection element.

5. A wiring information device configured to be associated with an electrical end-point as in claim 4, wherein said end-point label is associated with the electrical box so that the ep-label inner perimeter surrounds the electrical box outer perimeter and wherein said ep-label outer perimeter is similar to but smaller than the cover plate outer perimeter.

6. A warning device configured to be associated with an electrical end-point, said warning device comprising:
    a body defining a pair of opposed faces connected by a peripheral edge and wherein said body defines at least one hole therethrough so that said body defines an outer perimeter and at least one inner perimeter and wherein said outer perimeter defines a first polygonal shape and said at least one inner perimeter defines a second polygonal shape; and
    wherein said body is configured for being associated with an electrical end-point associated with a wiring system and provide a first mechanical property comprising one of (a) a gasket function or (b) an insulator function or (c) at least one electrical connector associated with a surface of said body configured to connect an aluminum electrical wire with a copper electrical wire; and
    a first informational property comprising a dissimilar wiring warring conveying a warning that the wiring system comprises aluminum wiring.

7. A warning device as in claim 6, wherein said electrical connector comprises one or more adapters configured to electrically associate an aluminum hot wire with a copper hot wire and an aluminum neutral wire with a copper neutral wire.

8. A warning device as in claim 7, wherein said electrical connector defines an information function.

9. A warning device as in claim 8, wherein at least one of said warning and said information function include text for an electronic address to an information source associated with a computer system wherein said information about said warning.

10. A wiring information device as in claim 1, wherein the electrical end-point is associated with a ceiling and configured for supporting a hanging device defining device that hangs from the end-point while in use and wherein said support function supports the hanging device while being electrically associated with the electrical-end-point.

11. A wiring information device as in claim 1, wherein the electrical end-point is associated with a ceiling and configured for supporting a hanging device defining a device that hangs from the end-point while in use and wherein said support function further defines a strain relief for the hanging device.

* * * * *